Dec. 27, 1927.  1,653,723
J. J. MEYER, JR., ET AL
BOTTLE MAKING MACHINE
Filed Nov. 7, 1917   12 Sheets-Sheet 1

INVENTORS
John J. Meyer Jr. and
John G. Lepper.
BY Hull Smith Brock & West
ATTORNEYS.

Dec. 27, 1927.

J. J. MEYER, JR., ET AL 1,653,723

BOTTLE MAKING MACHINE

Filed Nov. 7, 1917     12 Sheets-Sheet 3

INVENTORS
John J. Meyer Jr
John G. Lepper.

By Hull Smith Brock & West
ATTORNEYS

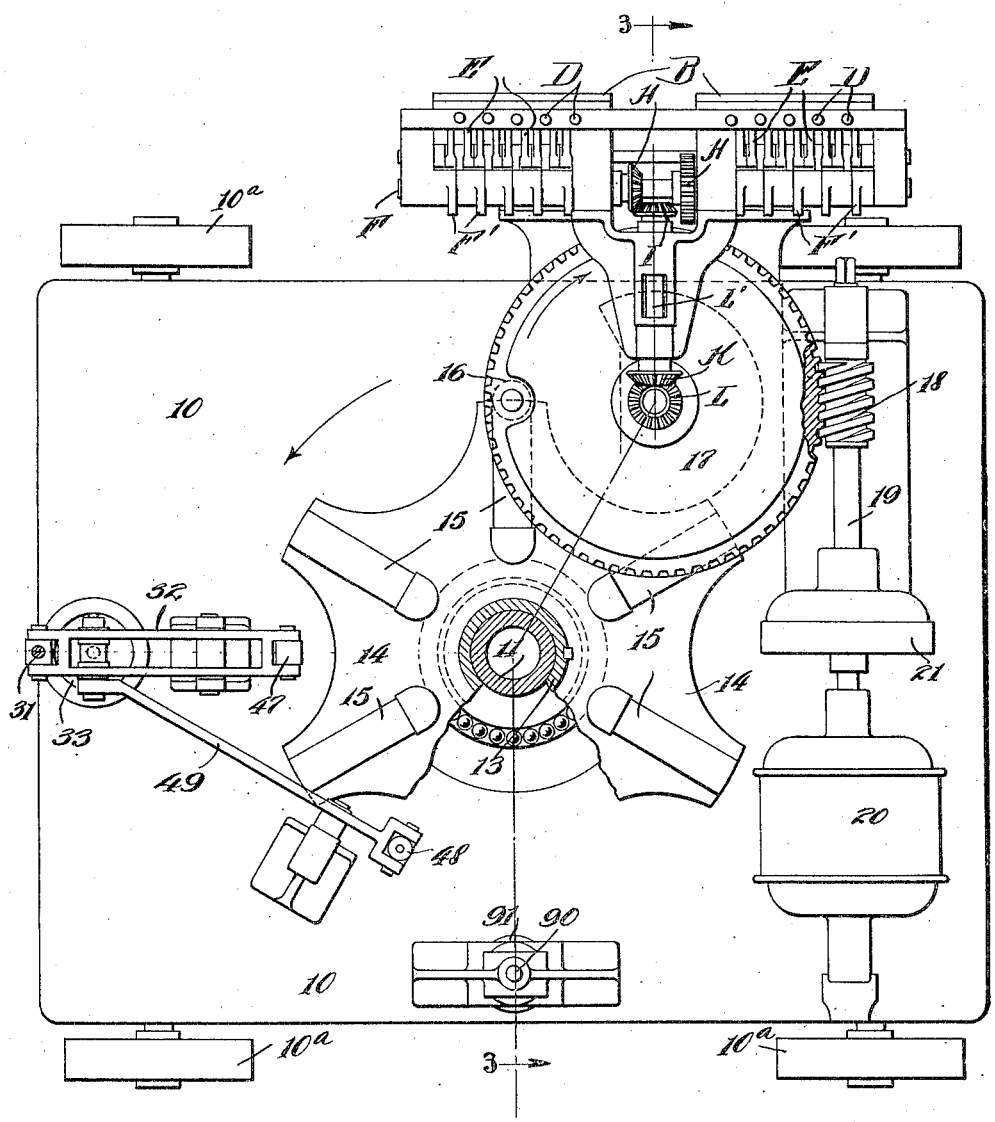

Dec. 27, 1927.　　　　　　　　　　　　　　　　　　　　1,653,723
J. J. MEYER, JR., ET AL
BOTTLE MAKING MACHINE
Filed Nov. 7, 1917　　　　　12 Sheets-Sheet 5

INVENTORS
John J. Meyer Jr.
John G. Lepper.
BY Hull Smith Brock & West
ATTORNEYS

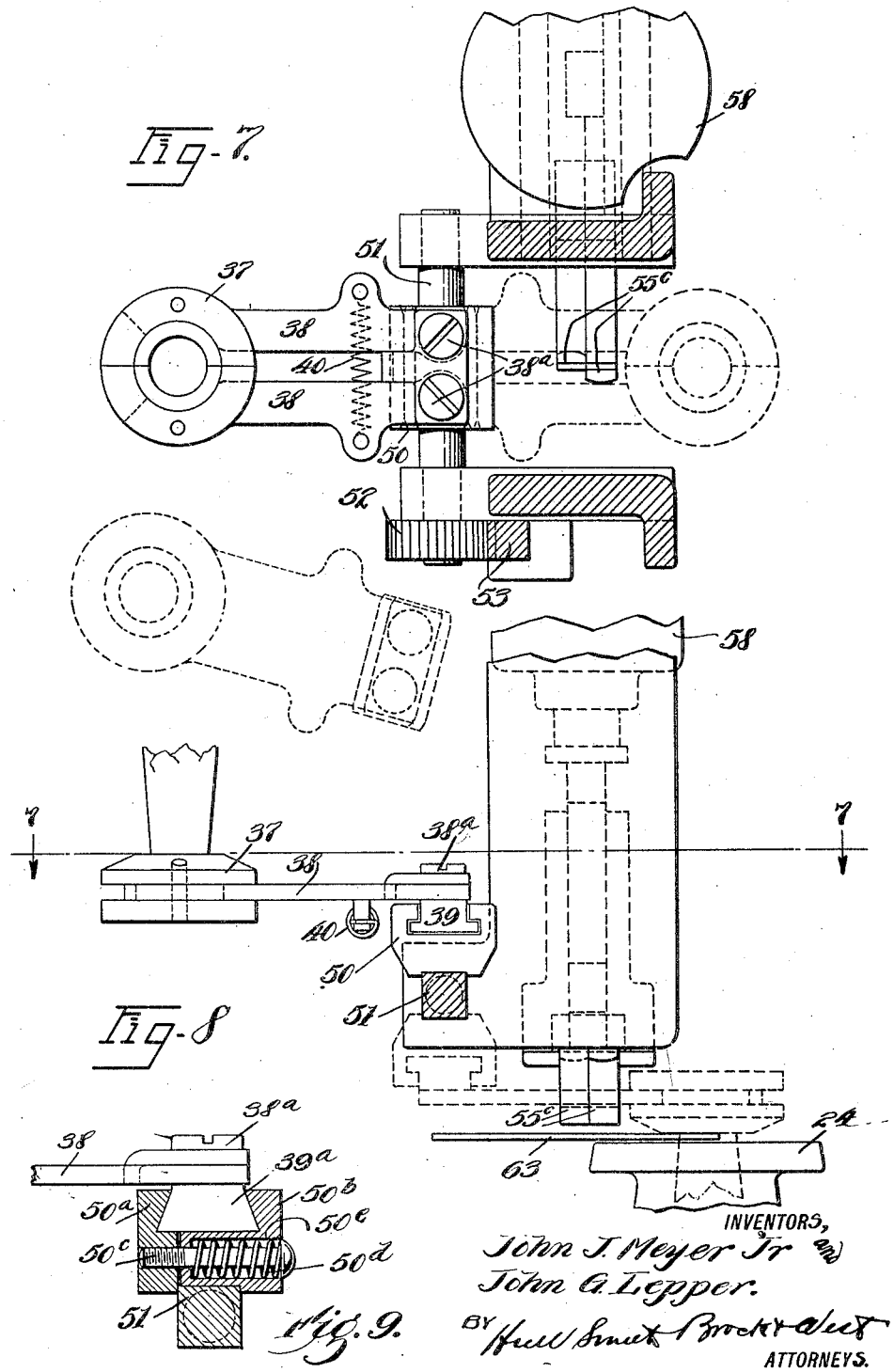

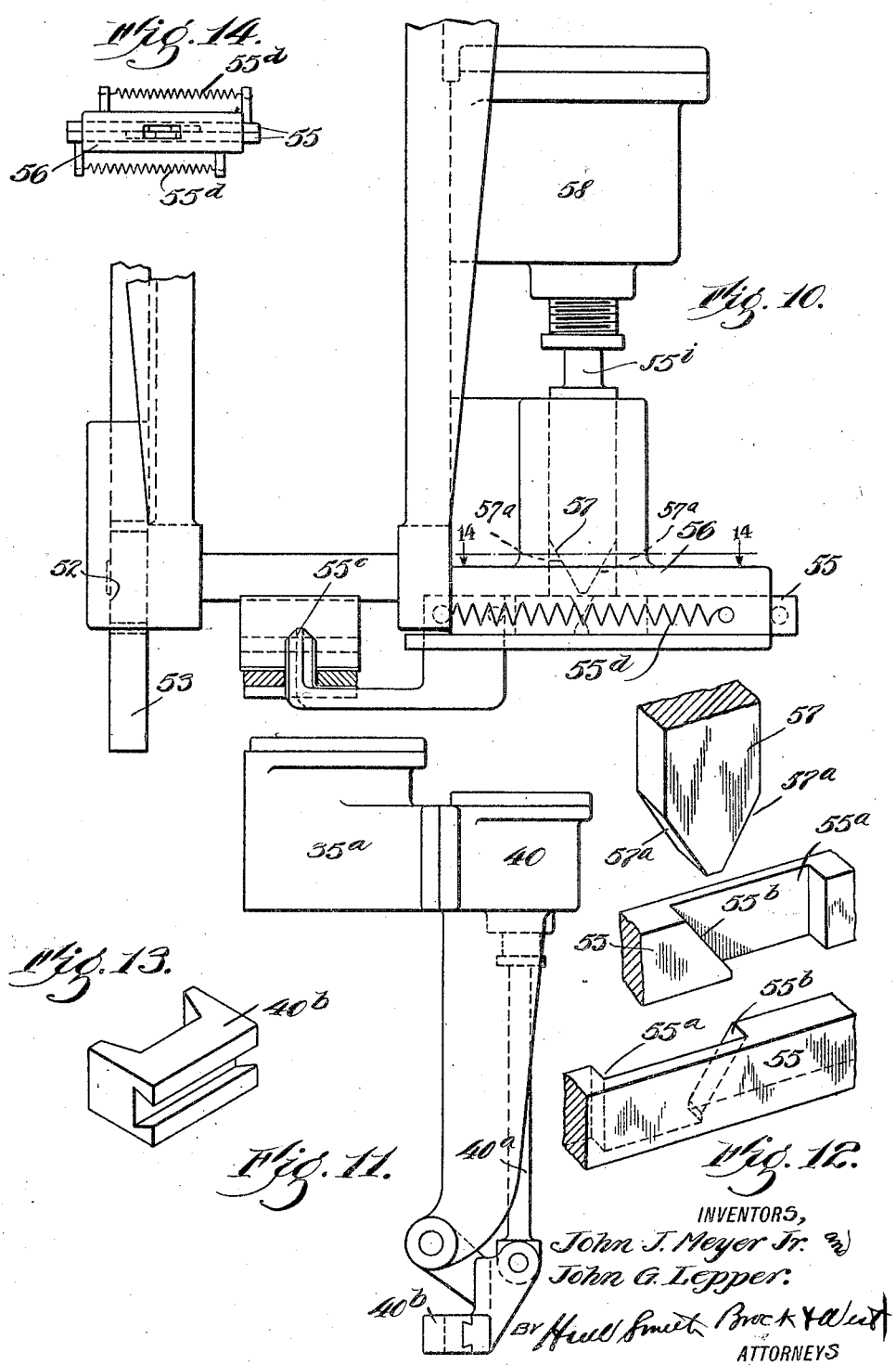

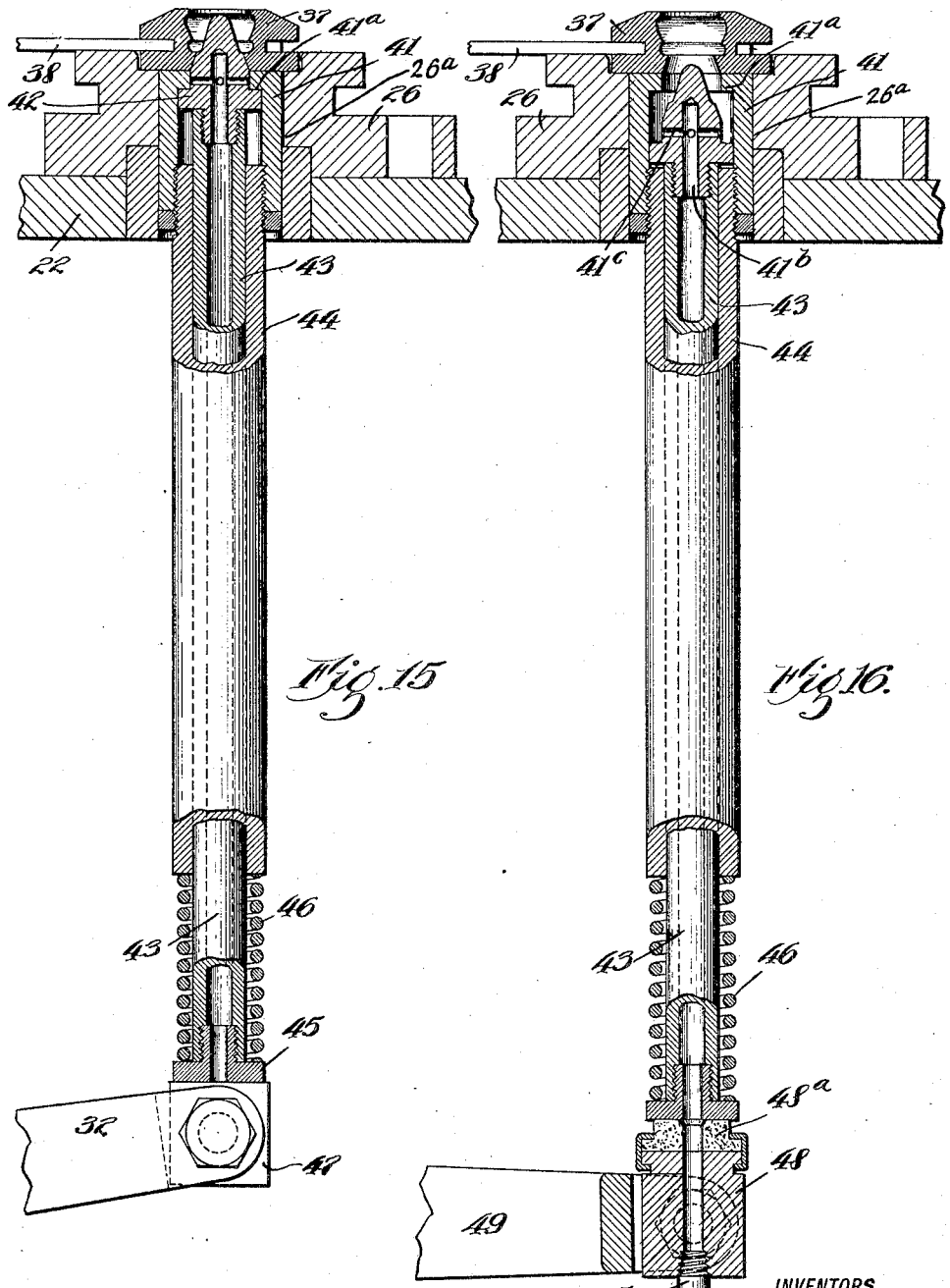

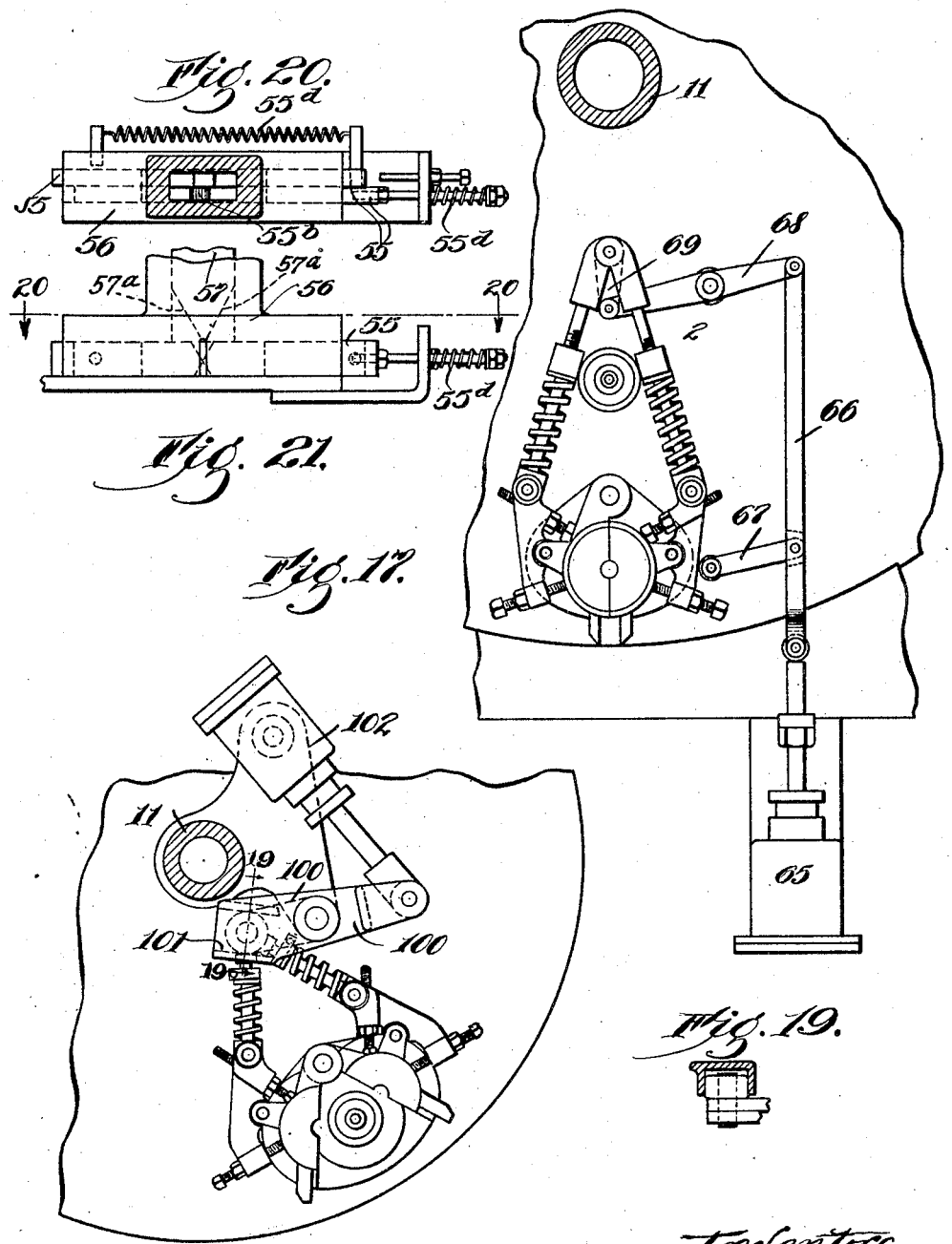

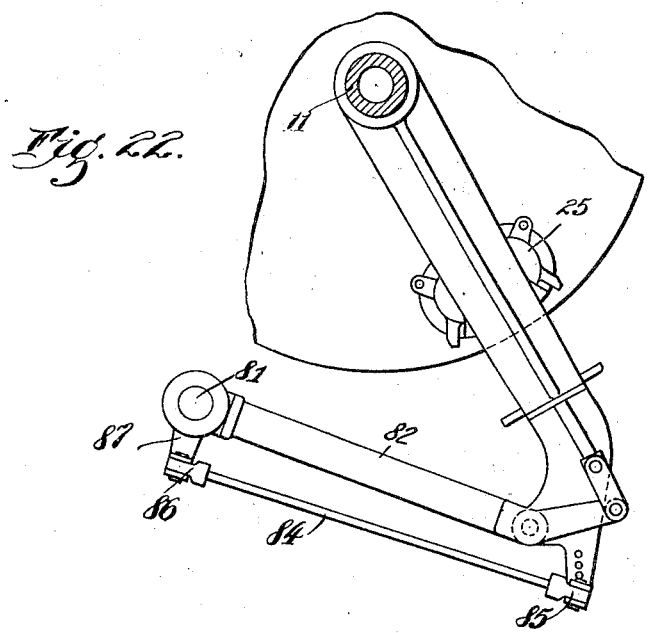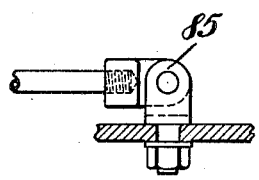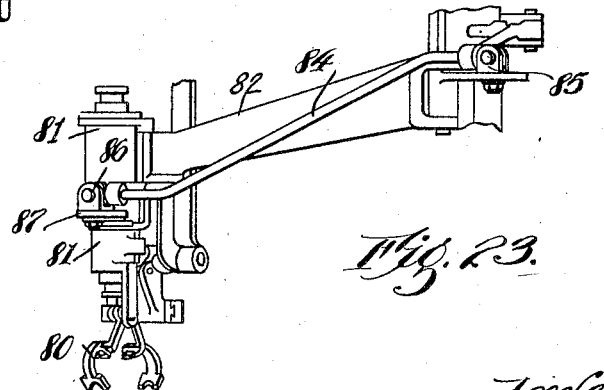

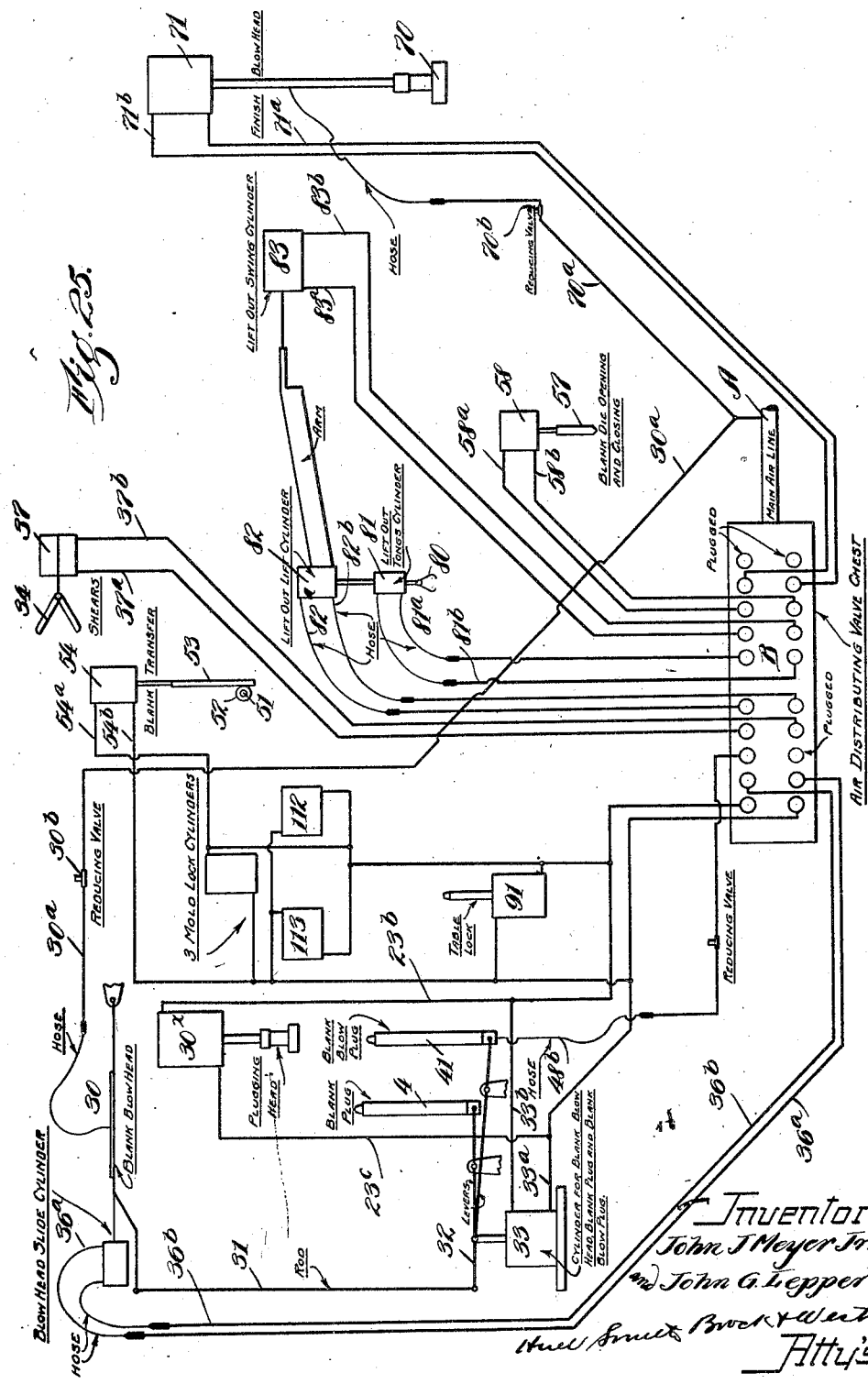

Patented Dec. 27, 1927.

1,653,723

UNITED STATES PATENT OFFICE.

JOHN J. MEYER, JR., OF GLENSHAW, PENNSYLVANIA, AND JOHN G. LEPPER, OF DECATUR, ILLINOIS, ASSIGNORS TO GLENSHAW GLASS COMPANY, OF GLENSHAW, PENNSYLVANIA, A CORPORATION OF PENNSYLVANIA.

BOTTLE-MAKING MACHINE.

Application filed November 7, 1917. Serial No. 200,670.

This invention relates generally to bottle making machines and more particularly to what may be termed a "one man machine", that is, a machine in which the services of a single operator are only employed to drop a batch of glass into a blank mold; all of the remaining operations, such as shaping and blowing the blank, blowing the finished bottle, removing the same from the machine and placing it upon a suitable carrier or conveyor, are automatically accomplished.

Bottle making machines are of two types; one which is entirely automatic, and the other in which both men and boys are employed in connection with the machine.

The object of this invention is to provide a one-man machine which will be economical of space and one in which the majority of the parts are pneumatically operated; and a further object is to provide a machine of this kind in which the parts will operate in their proper sequence and be held locked against movement except at the proper times.

With these objects in view, and certain other objects, which will become apparent as the description proceeds, the invention consists in various novelties of construction and combination, all of which will be fully described hereinafter and set forth in the appended claims.

Figure 1:
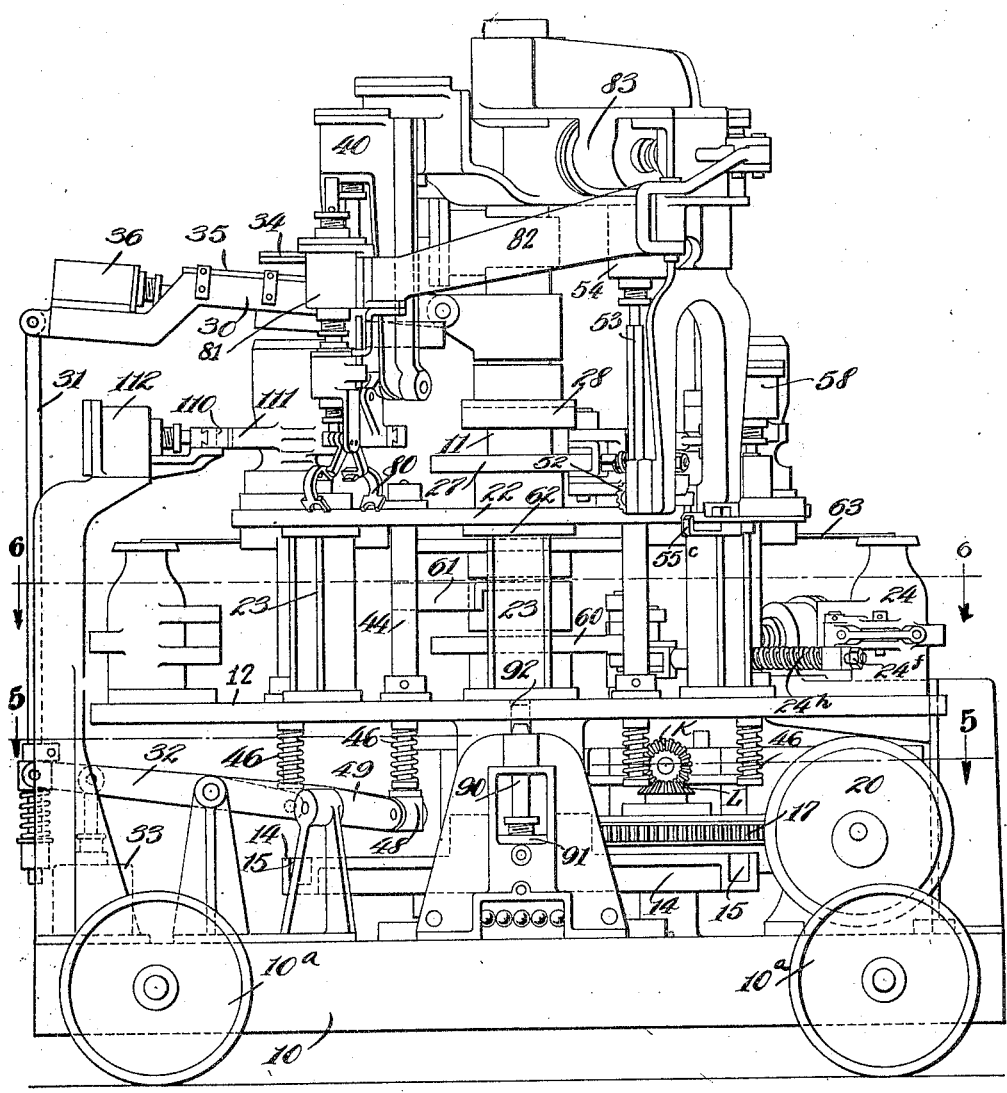
Figure 2:
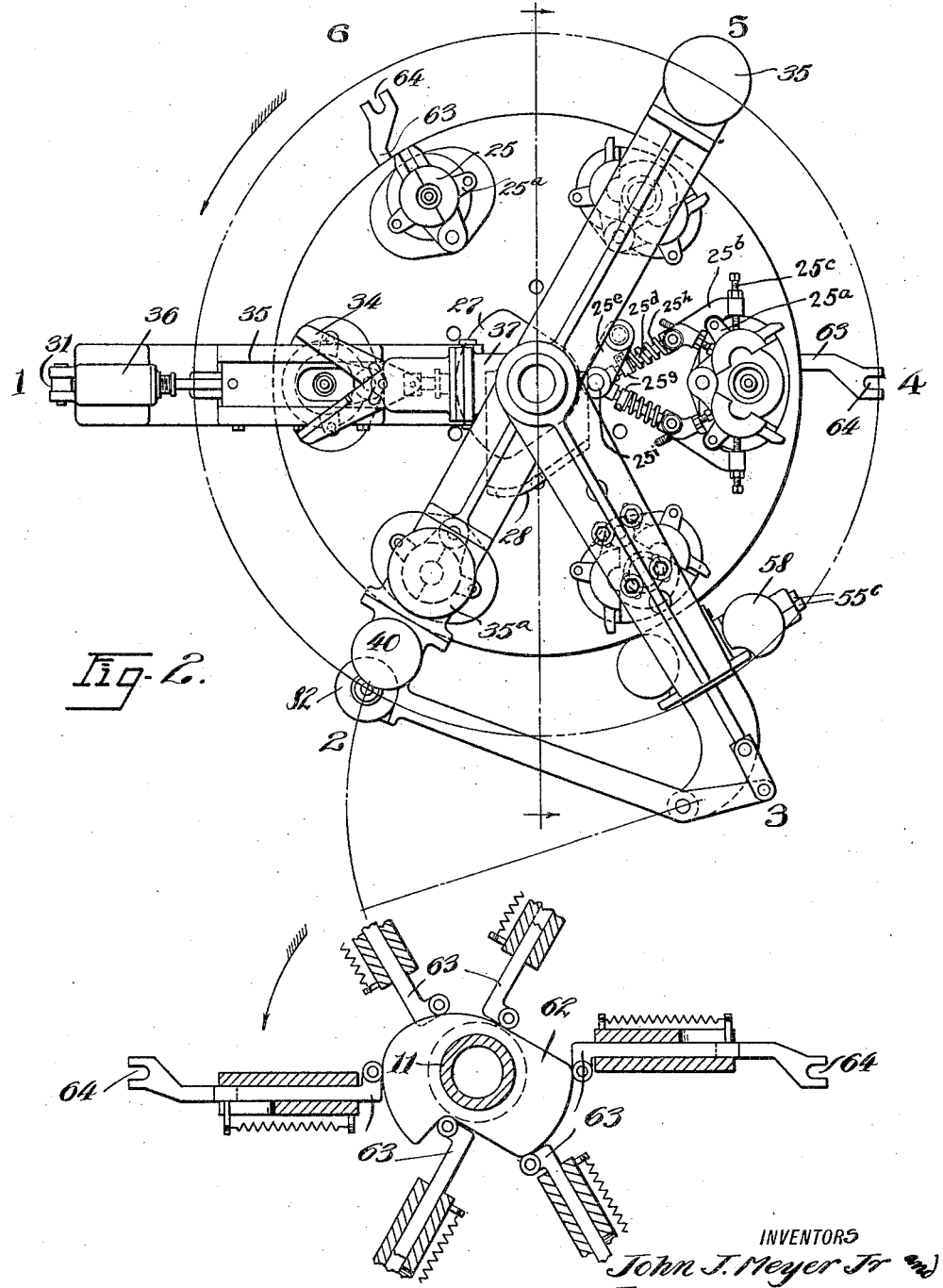
Figure 3:
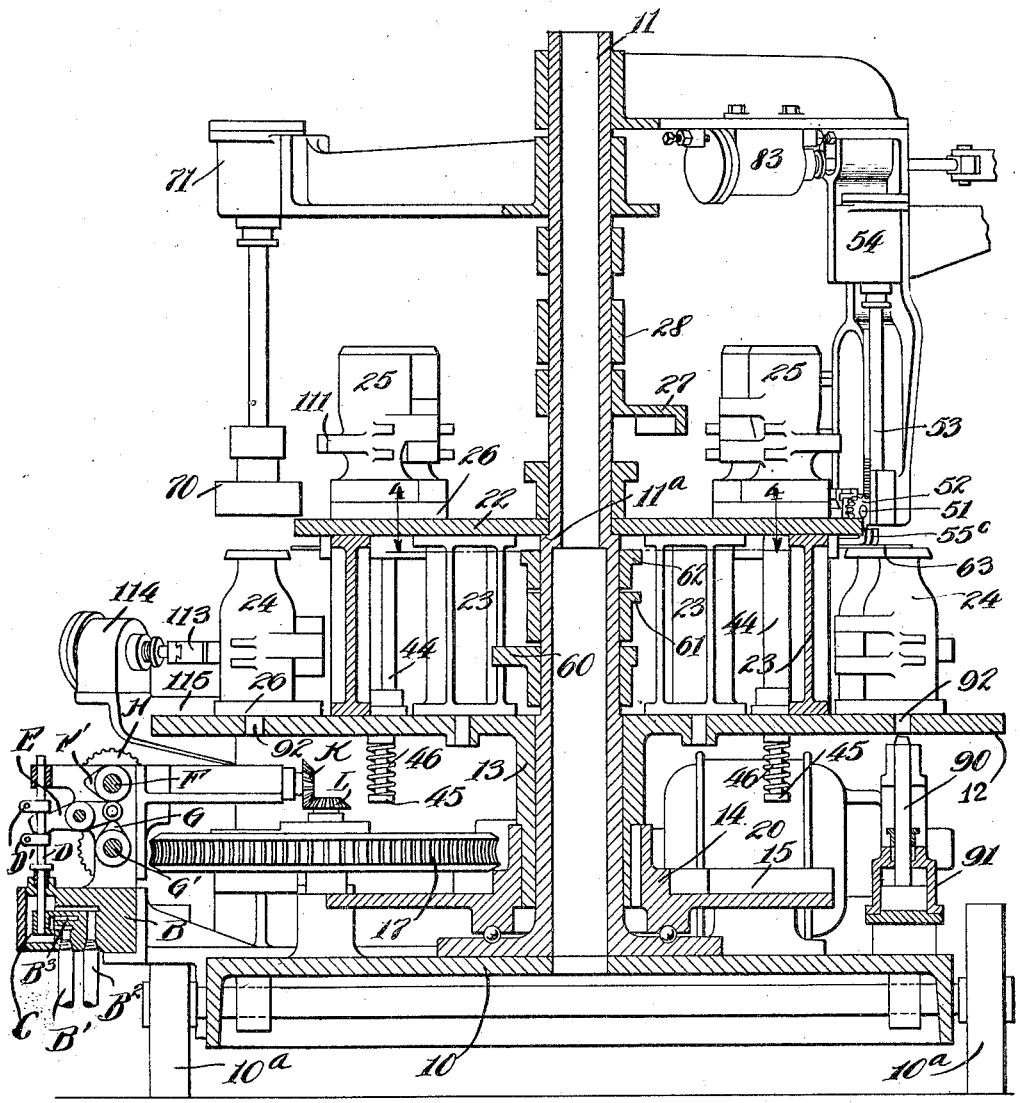
Figure 6:
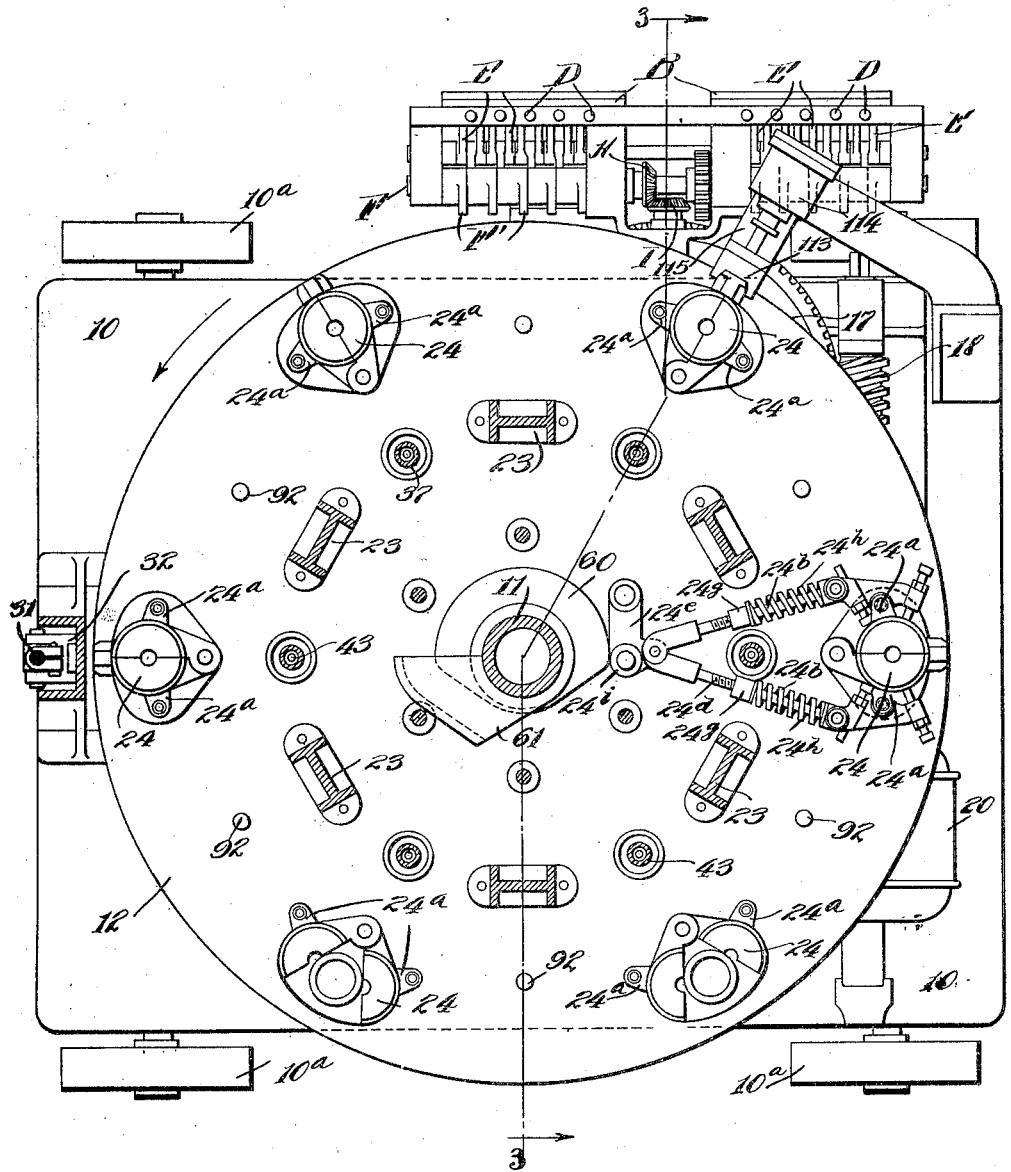
Figure 26:
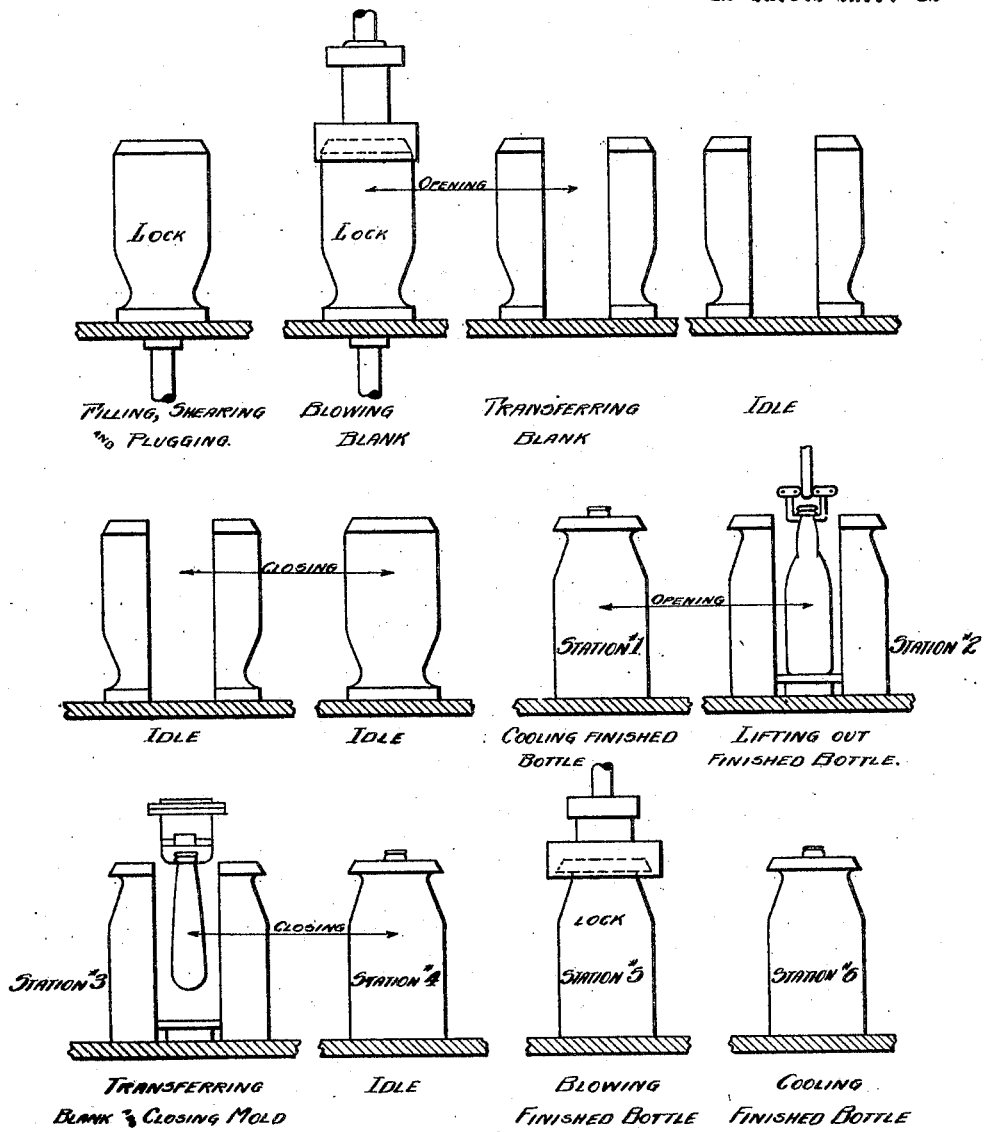

In the drawings forming a part of this specification, we have shown one embodiment of our invention and in which Fig. 1 is a side elevation; Fig. 2 is a partial plan view; Fig. 3 is a central vertical section in the lines 3—3 of Figs. 2, 5 and 6; Fig. 4 is a section on the line 4—4 of Fig. 3; Fig. 5 is a sectional view on the line 5—5 of Fig. 1; and Fig. 6 is a sectional view on the line 6—6 of Fig. 1; Fig. 7 is a sectional plan view of a transfer device; Fig. 8 is a side elevation of the same and Fig. 9 is a sectional detail and modified form of guide block; Fig. 10 is a detail view of the die separating mechanism; Fig. 11 is a detail view of the mold locking device; Fig. 12 is a detail view of a portion of the die opening mechanism; Fig. 13 is a detail perspective view of one of the mold locks; Fig. 14 is a detail taken on the line 14—14 of Fig. 10; Fig. 15 is a detail sectional view illustrating the manner of forming the neck of the bottle by means of the die and plug and Fig. 16 is a similar view showing the manner of blowing the blank, the plug being removed; Fig. 17 is a detail view showing a modified form of device for opening and closing the bottle molds; Fig. 18 is a detail view illustrating the modified form of device for opening and closing the blank molds; Fig. 19 is a detail on the line 19—19 of Fig. 18; Figs. 20 and 21 are detail views illustrating the modification of the mechanism illustrated in Fig. 14; the sectional plane of Fig. 20 being indicated by the line 20—20 of Fig. 21; Fig. 22 is a plan view of the device for means for turning the lifting fingers; Fig. 23 is a side elevation of the same view; Fig. 24 is a detail view of the universal connection; Fig. 25 is a diagrammatic view illustrating the air line connections and Fig. 26 is a diagrammatic view illustrating the various steps in the formation of the bottle made in accordance with our machine.

In constructing a bottle making machine in accordance with our invention, we employ a metal base 10 of suitable dimensions mounted upon rollers 10ª so that the machine as a whole can be easily moved to any point desired. Rigidly mounted upon the base is a central tubular standard 11 shouldered at 11ª, and turning freely upon the lower end of the tubular standard 11 is the lower turret, table or bottle mold carrier 12, having a depending hub portion 13 which is keyed to a star wheel 14, the hub portion of which turns upon ball bearings held in raceways, preferably formed integral with the base of the tubular standard 11, although this is a detail which may be varied as desired. This star wheel 14 has six radial grooves 15 produced in the upper face thereof, these grooves receiving an actuating roller 16 carried upon the bottom of the worm gear 17, this worm gear 17 being driven by the worm 18 arranged upon the shaft 19 driven from the motor 20, there being a planetary or other form of reduction gearing between the motor and worm shaft, and if desired a brake may be applied to the shaft for the purpose of stopping the machine instantly.

The periphery of the star wheel 14 intermediate the slots is cut away at six points in the arc of a circle in order to receive the centrally arranged depending circular portion of the worm wheel 17, in accordance with the well known Geneva movement, and as the motor and worm shaft are driven continuously and cause the worm gear to turn continuously, there will be an intermittent movement of the star wheel due to the fact that the worm gear carries one actuating roller 16 which moves into and out of the radial grooves of the star wheel and causes the star wheel to move while the roller is traveling in said groove, the circular depending portion of the worm wheel turning in the curved arc of the star wheel holds the same stationary while the roller 16 is completing its cycle after leaving one groove and before entering another.

A second turret, table or blank mold carrier 22 is mounted upon the central tubular shaft 11 and rests upon the shouldered portion 11$^a$ and this turret, table or blank mold carrier 22, is connected with and spaced above the lower turret, table or bottle mold carrier 12, by means of cast metal standards 23. By having the upper and lower turrets or carriers connected together as described, it is obvious that they will both turn in unison. Upon the lower turret or carrier there are arranged six bottle molds 24, and upon the upper turret or carrier are arranged six blank molds 25, the upper and lower molds being arranged on the same radial lines, but it will be noted that the upper turret or carrier is somewhat less in diameter than the lower one, and that the center of each lower mold is set beyond the outer edge of the upper turret.

While we have shown these upper and lower turrets or carriers as circular tables, it is obvious that they could be of skeleton formation if preferred.

Each blank mold 25 consists of two vertical sections hinged together and resting upon a base 26.

Each mold section has laterally projecting arms 25$^a$ to which are attached carriers 25$^b$; set screws 25$^c$ being employed to properly position the mold sections in said carriers. Each carrier 25$^b$ has an operating rod 25$^d$ connected thereto, these rods being pivotally connected at their inner ends to one end of a link 25$^e$. The outer ends of the rods are threaded and pass through lugs on the carriers 25$^b$. Collars 25$^g$ are arranged upon these rods and springs 25$^h$ are arranged on the rods between the collars 25$^g$ and the carriers 25$^b$, to avoid breakage of parts in case any obstruction should prevent the mold sections closing.

The opposite ends of the links 25$^e$ are pivotally connected to the upper table or turret and the ends of the links to which the rods are connected carry rollers 25$^j$ which are acted upon by the push in cam 27 mounted upon the central standard and which with rods 25$^d$ serve to move the sections of the blank molds together at the proper time as hereinafter explained, and these rollers are also acted upon by the pull out cam 28 which serves to open the sections of the mold.

Inasmuch as we employ six blank forming molds and six bottle forming molds we shall refer to the complete cycle of operation of the machine as embracing six stages and have accordingly designated these stages as 1, 2, 3, 4, 5, and 6. By reference to Fig. 26 it will be noted that the sections of the blank forming molds are closed at the 6th stage and are also closed at the first stage. When the blank forming mold is at the first stage it rests directly beneath a blank blow head 30 which is raised and lowered by means of a rod 31 actuated by a lever 32 which in turn is operated by the piston of a pneumatic cylinder 33, compressed air being supplied to this cylinder in the manner hereinafter explained. In connection with the blank blow head 30 is a pair of shears 34 and a blow head slide 35 actuated by a cylinder 36, the shears being actuated from a cylinder 37. The blank blow head is pivotally connected to the central tubular standard 11, and as before stated is moved up and down by means of the rod 31 in order to bring the blank blow head into firm contact with the upper end of the blank mold.

When the blank mold has reached stage number 1 and the blank blow head has been lowered thereupon the shears are open, as indicated in Fig. 2 and the slide 35 is also in its open position and consequently the operator can by means of a rod or tube draw a sufficient amount of glass from the pot and drop the same into the blank mold and when a sufficient quantity of the glass batch has passed into the blank mold the operator touches an air control lever which actuates the shears 34, or these shears may be automatically actuated as hereinafter explained. Just after the shears are actuated the slide 35 is closed and air is introduced into the top of the mold through this slide, communication being had with the main air supply.

As previously stated, each blank mold is composed of two vertical sections hinged together and these rest upon a suitable base 26 having a central recess 26$^a$ in which rests the neck forming die 37, composed of two separable sections connected to arms 38, these arms being pivotally connected at 38$^a$ to a block 39 and normally held together by means of a coil spring 40.

Each base 26 also has a central circular opening in which is secured a bushing 41 having an inwardly projecting shoulder 41$^a$ and working in this bushing is a plug 42 which is adapted when forced up to its limit to enter the central opening in the neck forming die and close the same. This plug 42 is carried at the upper end of a pipe 43 which works in a pipe 44 rigidly secured to the bushing 41. The pipe 43 projects a considerable distance below the end of the pipe 44 as shown and has a flanged nipple 45 secured in the end thereof and a coil spring 46 surrounds this depending end of the pipe between the flanged nipple 45 and the end of the pipe 44. The pipes 43 and 44 project below the lower table or turret as most clearly shown, and when the blank mold is at stage number 1, the lower end of the pipe 43 rests directly above a block 47 carried upon the end of the lever 32, this lever being actuated also from the cylinder 33, and when the blank forming mold comes to a stop at the first stage, this lever 32 will force the plug 42 completely into the die and inasmuch as the batch of glass which is deposited in the mold will drop to the bottom thereof and rest upon this die, the neck of the bottle will be properly shaped when air pressure is applied to the blank mold upon the top of the glass through the blow head 30. In other words, during the blank forming operation of the neck, the pressure is downwardly upon the batch of glass contained within the blank forming mold.

As the forming of the neck in the die is completed the blank blow head 30 is elevated, shears open and slide 35 also opened and the mold with the batch of glass therein moves on to the second stage and comes to rest, and at the same time that this mold with the blank partially formed therein comes to rest at the second stage, the next adjacent mold has reached the first stage and will receive its batch of glass therein and have the bottle neck shaped in the die as previously explained.

When the mold, which we will designate as the first mold moves away from its station 1, the spring 46 will force the pipe 43 down, withdrawing the plug 42 from the die and when the second stage is reached, the lower end of this pipe 43 will rest upon a block 48 carried at the end of a lever 49 which is operated also from the air cylinder 33 and this block 48 carries a suitable packing $48^a$ and has a flexible air tube $48^b$ connected therewith and through which air passes into the pipe 43, and it will be noted that the plug 42 has a central longitudinal bore $41^b$ and transverse openings $41^c$ through which air escapes and inasmuch as the plug is not projected upwardly into the die at the second stage, air will pass up into the batch of glass and shape the blank inasmuch as the plug in the first stage has produced a slight central indentation which will receive the upwardly directed blast of air and cause the blank to be formed in this blank forming mold at the second stage, the top of mold being closed up by a plugging head $30^x$ operated by an air cylinder and so timed as to close the mold as soon as it comes to rest at station number 2. The mold is held closed by mold lock $40^b$ carried at end of piston $40^a$ operated by air cylinder 40. It will be noted that this blank forming operation at the second stage is accomplished by an upwardly directed current of air and the blank when formed is in an inverted position, that is the neck of the bottle is at the lower end of the mold and is held in the die 37 which, as previously stated consists of two separable sections carried by arms 38 attached to the block 39, these arms with block projecting radially outward from the blank forming mold, suitable grooves being cut in the mold section to position such arms if desired.

After the first mold has had the blank blown therein at the second stage, it moves to the third stage and as it approaches this third stage the pull out cam 28 acting upon the rods $25^d$ connected with the mold sections cause said sections to open, leaving the blank standing erect in the die 37 which rests centrally upon the base of the mold. As the mold approaches this third stage the block 39 on the arms and die passes into a grooved block or guide 50 mounted upon a shaft 51 which has a pinion 52 upon the end thereof, which pinion is engaged by a rack 53 carried at the end of a rod operated by the air cylinder 54, and after the mold has been opened and has come to rest at the third stage the rack 53 operating upon the pinion 52 rotates the shaft one half a turn carrying with it the guide 50, and block 39 which in turn carries the die, holding the blank which is caused to describe a half circle and be delivered between the open sections of the bottle forming mold 24 arranged upon the lower table or turret in radial alignment with the blank forming mold as previously described. The die 37 is carried by the two arms 38 and the spring 40 normally holds the arms 38 in parallel relation and the die sections together so as to provide a complete unbroken circle, and when the blank is delivered to the opened bottle forming mold 24, it is of course necessary to disengage the die from the blank and in order to do this we provide for the opening or separation of the die which is accomplished by means of two oppositely moving fingers 55 arranged in a suitable guideway 56 and in which also works a plunger 57 operated from the air cylinder 58, the cylinders 54 and 58 and shafts 51 being carried by a casting connected with the central standard.

The lower end of the plunger 57 is bevelled in both directions as shown at $57^a$ and the fingers 55 have their opposing faces recessed as shown at $55^a$ and the opposing walls of these recesses are inclined in reverse directions as shown at $55^b$, these inclined walls being engaged by the bevelled or tapered faces of the end of plunger 57 so that when said plunger descends the fingers 55 will be caused to move in opposite directions and their upturned ends 55ᶜ resting between the arms 38 will operate upon said arms separating them sufficiently to open the die and release the blank; and as soon as the plunger 57 returns to its normal position, springs 55ᵈ draw the fingers 55 back to their normal position and consequently the arms and die assume their normal position so that upon reverse movement of the rack, the die will be returned to its respective blank forming mold and will be properly positioned in the recess in the base thereof.

Instead of employing the pull out cam 28 for opening the mold at the third stage, we may employ a lever 100 having depending lugs 101 which engage the roller carried by the pull out rods 25ᵈ. The lever 100 is actuated by an air cylinder 102 pivotally mounted upon a bracket fastened to the central standard and this bracket may be the same one to which the lever 100 is pivoted if desired. Furthermore, the air cylinder 102, besides actuating the lever to open the mold, also actuates the same to close the blank mold just before moving from the third station to the fourth station as experience has demonstrated the fact that after the die has been returned to the blank mold it is better to have the mold closed during the continued movements of said blank mold.

In Figs. 7 and 8 we have shown the block 50 as having a T-shaped groove in order to receive the T-shaped block 39. In Fig. 9 we have shown a slight modification in which the block 39ᵃ is made dovetail in cross-section and the guide block instead of being made in one piece is composed of two sections 50ᵃ and 50ᵇ connected by a bolt 50ᶜ surrounded by a coil spring 50ᵈ located in a recess 50ᵉ produced in the section 50ᵇ and the receiving groove is also dovetailed instead of T-shaped in cross-section. Making the block in two sections and holding them together by a spring pressure will prevent any stoppage of the machine due to any slight inaccuracy in the position of the block 39ᵃ as it is obvious that the two-piece block will yield in order to compensate for any slight inaccuracy.

The blank as before stated is inverted and transferred from the blank mold at station 3 to the bottle forming mold at station 3 and the sections of the bottle forming mold can be closed upon the blank as the said mold starts to move toward the fourth stage or means may be employed for supporting the blank by the neck while the open mold is moving to the fourth station. It will be understood that each bottle mold 24 has the laterally projecting arms connected to carriers 24ᵃ which in turn are connected to the operating rods 24ᵇ pivotally connected at 24ᶜ to a link 24ᵈ pivoted at 24ᵉ and at the pivotal connection of the arms and link there are provided rollers 24ᶠ and 24ᵍ adapted to engage respectively with the push out cam 60 and the pull in cam 61 mounted upon the central tubular standard 11. In addition to the cams 60 and 61 there is also a cam 62 arranged directly beneath the table or turret 22 and which is adapted to engage the inner ends of the arms 63, the outer ends thereof being forked at 64 and adapted to support the bottle by the neck at certain predetermined times and by reference to Fig. 4 it will be seen that the cam 62 is of such shape and so arranged that the arm 63 will be forced out to engage the neck of the blank at the third station and will continue in such position until after the blank in the bottle mold reaches the fourth station at which time the mold will be closed by means of the push out cam 60 previously referred to. The arm 63 will be withdrawn after the bottle mold is closed upon the blank at station 4. In case it is not desired to use the bifurcated arms 63 we may close the bottle mold at station 3 just after the blank has been transferred and this is accomplished by means of a cylinder 65 having its piston operated upon a rod 66 which is connected to a link 67 and a lever 68, the lever and link being connected to the lower table adjacent to the mold, and the lever 68 is in turn connected to a rod 69 which is connected to the pivotal connection of the spring arms 24ᵇ. It will be understood that there are arms, links and levers arranged in connection with each mold but only one cylinder 65 will be necessary as its piston will operate upon the end of the arm 66 inasmuch as said rod will be in direct alignment with the piston when the mold has stopped at the third stage. The mold being closed immediately it leaves the third station will remain closed at the fourth and fifth and sixth stations and the push out cam 60 will of course be dispensed with if the pneumatic means for closing the molds is employed. The pull out cam 61 will be retained for opening the mold between the first and second stations. When the bottle mold reaches the fourth station it remains closed and no additional operation takes place at this point. When it reaches the fifth station a blow head 70 is forced down by the cylinder 71, said blow head coming in contact with the neck of the bottle and this blow head being in communication with the main air line, air is forced into the blank and the finished bottle is blown. When the blowing operation is accomplished the blow head 70 is raised by the reverse movement of the piston in a cylinder 71 and the mold with the finished bottle therein moves to the sixth station and is still in a closed condition. It then moves to station No. 1 still closed and between stations No. 1 and stations No. 2 it is opened. Just as the mold is opened at the 2nd station, the bottle is gripped by means of the lifting fingers 80 operated from the cylinder 81 carried by the arm 82 pivotally connected to the casting attached to the central shaft and caused to swing back and forth through the arc of a circle by means of the cylinder 83, this lifting device being substantially the same as that shown, described and claimed in Letters Patent granted to us January 9, 1917, No. 1,211,611. As the fingers 80 descend to grasp the bottle they are caused to turn so as to pass to each side of the bottle neck thereby avoiding any possibility of striking the bottle and tilting the same. This turning of the fingers is accomplished by means of a rod 84 having a universal connection at 85 with a stationary plate and at its lower end has a similar connection 86 with an arm 87 connected to the piston rod carrying the fingers so that these parts may swing back and forth and up and down and at the same time accomplish their various functions. The connection 85 is adjustable along the stationary plate in order to regulate the amount of turn which will be given to the fingers. The arm 82 is swung so as to bring the gripping fingers 80 into the proper position for gripping the bottle and these fingers are then caused to descend and in so doing approach each other and grasp the bottle therebetween. The fingers thus gripping the bottle are raised, then the arm is swung outwardly and the fingers open so as to deposit the finished bottle upon an endless conveyor arranged adjacent to the machine.

We will now describe the various mechanisms for controlling and directing the air whereby the pneumatic operations of the machine are carried out and in Fig. 25 we have illustrated in diagrammatic form the various air lines and in referring thereto A designates the main air line which delivers air to a box or chest B which has ports $B^1$ and $B^2$ therein and also an exhaust port $B^3$ and communicating with these ports $B^1$ and $B^2$ are the various air pipes hereinafter explained. These ports $B^1$ and $B^2$ are arranged in series and it will be noted that there are ten ports $B^1$ and ten ports $B^2$ and from which lead the air lines to the various operative devices. In connection with each port is a valve C having a stem D extending up through the air chest or box, this stem working through a suitable guide and having stops D' secured thereon, and working between these stops is one end of a lever E mounted upon a suitable bracket, the opposite end of said lever being operated upon by the cams F and G mounted respectively upon the shafts F' and G', these shafts each having a bevel gear H which mesh with a bevel gear I mounted upon the end of a shaft I' and carrying a bevel gear K which meshes with another bevel gear L mounted upon a central extension or hub portion of the worm wheel 17 and as this wheel 17 is in constant rotation the cam shafts F' and G' will be in constant rotation, and by placing the cams thereon in their proper relative positions the valves with which they are operatively connected can be made to open or close at the proper time in order to direct the current of air to the proper mechanism.

By referring to the diagram it will be noted that the blank blow head 30 is connected to the main air line by means of an air pipe $30^a$ and a reducing valve $30^b$ is interposed in this line. The finishing blow head 70 is connected also with the main air line by means of the air pipe $70^a$ and a reducing valve $70^b$ is also interposed in this line. The cylinder 33 is connected by pipes $33^a$ and $33^b$, respectively, and the blow head slide cylinder 36 is connected with the air chest by means of pipes $36^a$ and $36^b$, respectively. The plugging head cylinder $30^x$ is connected by means of a pipe $23^c$ with the pipe $33^a$, and a pipe $23^b$ with the pipe $33^b$. Air to the blank blow plug 41, as before stated, is supplied by the flexible pipe $48^b$ which connects with one of the ports. The cylinder 54 operating the blank transfer is connected with the valve chest by pipes $54^a$ and $54^b$, $33^b$ and $33^a$ respectively and also in connection with these pipes are the mold lock cylinders 112 and 113 and the table lock cylinder 91. The shear cylinder 37 is connected by means of pipes $37^a$ and $37^b$, respectively and the cylinder 83 which operates the lift-out arm is connected by pipes $83^a$ and $83^b$, while the cylinder 82 is connected by pipes $82^a$ and $82^b$, respectively, and the cylinder 81 has pipes $81^a$ and $81^b$ connecting it with the valve chest. The cylinder 58 which operates the plunger 57 in connection with the transfer is connected by means of pipes $58^a$ and $58^b$, and the cylinder 71 which raises and lowers the finishing blow head is connected by pipes $71^a$ and $71^b$, respectively. The valve chest and parts connected therewith is arranged at one side of the machine base, as most clearly shown, and access can be quickly and easily had thereto, and furthermore whenever desired any particular valve can be manually operated by pushing down upon the valve stem.

It will thus be understood that a batch of glass is deposited in the blank mold at station 1 and as the batch is descending into the mold the shears are operated and the blank blow head caused to descend upon the blank mold. The blank blow head slide is then closed and as the plug has been forced upwardly into the bottle neck die contained in the bottom of the blank mold, air introduced into the upper portion of the blank mold will force the glass into the die and properly shape the neck portion of the bottle.

After this operation at station 1, the blank blow head, shears and slide and also the plug return to their normal positions and the machine turns so as to bring the first mold around to stage No. 2. When the machine stopped at the first stage a locking bolt 90 was projected upwardly by means of the air cylinder 91 and caused to engage a recess 92 produced in the bottom of the lower table 12 for the purpose of holding the tables locked during the blowing operations and this locking bolt is withdrawn just before the movement of the tables begins, and becomes operative again as soon as the table reaches the second stage.

At the second stage the blank cap 30ˣ descends upon the top of the blank mold and air is introduced through the plug and the complete blank is formed in the blanking mold at this stage No. 2. The blank mold still closed then moves to station No. 3 and as it reaches station No. 3 this mold is opened preferably by means of a lever 100 having depending lugs 101 to engage the roller upon the pull out arms for opening the mold, this lever 101 being actuated by the air cylinder 102 trunnioned upon a bracket attached to the central standard 11.

When the blank mold reaches station number 3, the block 39 has moved into the grooved guideway 50 or 50ᵃ and by the rack 53 and pinion 52 the die is flopped over carrying with it the blank depositing the same in the open blow mold at station number 3 and just as the die carrying arms 38 reach the limit of their downward movement, the fingers 55ᶜ operate to separate them, opening the die and releasing the blank just as the blow mold at station number 3 is closing on the same or the forked rod 63 is moving out to support the blank. In either event the die is relieved of the blank by the fingers 55ᶜ operating upon the arms 38 and as soon as these fingers 55ᶜ assume their normal position the spring 40 brings the arms 38 back and closes the die 37 and the reverse movement of the rack and pinion returns the die to its seat in the base of the blank mold.

The blank mold continues around to receive another batch of glass at station number 1 and the blow mold with blank therein will move around to the 4th station where nothing happens and then to the 5th station where the finishing blow head descends and blows the finished bottle in the mold, which moves to the 6th stage still closed and between stations 1 and 2 the mold is opened in order to permit the removing device to grasp the bottle and place it upon the endless conveyor. The blank and blow molds move in unison and the movement is intermittent in order to halt the machine long enough at station number 1 to permit the batch of glass to be deposited, and while this halt is made the various other operations are taking place such as, blowing the blank at station number 2, transferring the blank at station number 3, blowing bottle at station number 5 and removing finished bottle opposite station number 1 or 2 as preferred.

The details of the finishing blow head are shown and described in Letters Patent No. 1,209,472 granted to John J. Meyer, Jr., December 19, 1916.

Instead of the lever and air cylinder the blank mold at station number 3 can be opened by the pull out cam 28 but in practice we have found the cylinder lever to operate quickly and furthermore by a reverse movement of the piston and lever the mold can be closed again immediately the die has been returned to its proper position after the blank has been transferred to the bottle blowing mold on the lower table and just before the machine started again. While the blank mold is at station number 1 a mold lock 110 is brought into engagement with lugs 111 carried by the mold sections so as to maintain the mold closed during the blowing of the blank this mold lock 110 being actuated by the air cylinder 112 supported upon a bracket attached to the base of the machine and a mold lock is also employed to lock the mold at the second station. A similar lock 113 is employed for locking the mold while the finished bottle is being blown this lock 113 operating in conjunction with the lower or bottle molds and is operated from the air cylinder 114 carried by the bracket 115 attached to the base of the machine.

Although we have shown and described our present embodiment as a one man machine in which the batch of glass is manually deposited in the material, it is obvious that so far as the machine itself is concerned it can be used in connection with a flow, feeder or gathering device in which case it would become a "no man" or automatic machine.

Having thus described our invention what we claim is:—

1. In a bottle making machine, the combination with a blank mold, of a blow mold arranged below the blank mold, said molds being movable in unison about a common center; a die in the base of the blank mold, and pneumatically operated means arranged at a point in the path of travel of said molds, for lifting said die through the arc of a circle from the blank mold, turning, opening said die to release the blank and returning the same to said blank mold base while the blank and blow molds are open and at rest.

2. In a bottle finishing machine, the combination with a blank mold adapted to move through a cycle of stages, of a bottle mold adapted to move through a cycle of stages, a neck forming die located in the base of the blank mold, means for opening and closing the blank molds, a blank blow head being adapted to engage the top of the blank mold at one stage, a blank head cap adapted to engage the top of said mold at another stage, a combined plug and blow pipe being adapted to cooperate with said die and blank mold, pneumatically operated means arranged at a point in the path of travel of said molds for lifting said die from the blank mold, opening the same and returning the same closed to the blank mold, said movements of the die effecting the transfer of a blank from its mold to its respective blowing mold and the finishing blow head adapted to cooperate with said bottle mold and blow the finished bottle together with means for removing the finished bottle from the machine.

3. In a bottle making machine, the combination with a blank mold, of a die arranged in the base thereof, a blow-head for closing said blank mold, said blow-head being adapted to convey air to said mold to force the glass about said die, a bottle finishing mold arranged in radial alignment with and below the blank mold, pneumatically operated means arranged at a point in the path of travel of said molds for turning the die with blank connected thereto from the blank mold into the bottle mold, and means for removing the finished bottle from said last mentioned mold.

4. In combination with a blank mold of a closure for the same, and adapted to convey air to said blank mold, shears operating above said closure, a die in the base of said mold, a plug adapted to enter said die, means operating said closure, shear, and plug, means for moving said molds in unison and pneumatically operated means arranged at a point in the path of travel of said molds for inverting the blank and transferring the same to said finishing mold.

5. The combination with a blank mold, of a die arranged in the base thereof, pneumatic operated means for closing and opening said blank mold, a bottle finishing mold arranged in radial alignment with and below the blank mold, said blank and bottle finishing molds, being movable about a common center, pneumatically operated means for turning the die with blank connected thereto from the blank mold into the bottle finishing mold, pneumatically operated means for closing and opening said bottle finishing mold and a blow head adapted to cooperate with said finishing mold, subsequent to the removal of the die.

6. The combination with a blank mold and means for opening and closing the same, of a bottle finishing mold arranged in radial alignment with the blank mold and below the same, said blank and finishing molds being movable about a common axis, together with means for opening and closing bottle finishing mold, a die arranged in the blank forming mold and pneumatically operated means for swinging said die from the blank mold over into alignment with the bottle finishing mold and simultaneously opening the same to release the blank, a blow head in operative relation with the bottle finishing mold and pneumatically operated bottle lifting fingers adapted to remove the finished bottle from the bottle finishing mold when opened.

7. In a bottle making machine the combination with a central standard, of an upper and lower revolving turret mounted upon said standard and movable in unison about a common axis, a plurality of blank molds carried by the upper turret, a plurality of bottle finishing molds carried by the lower turret, the bottle finishing molds being in radial alignment with the blank molds, the movement of said bottle and blank molds forming a complete cycle for the formation of a finished bottle, a die arranged in each blank mold, means for opening and closing the blank molds at predetermined times together with means for opening and closing the finishing molds at predetermined times, pneumatically operated means arranged at a point in the path of travel of said molds for turning the die at a predetermined time so as to transfer the blank from the blank mold to its respective finishing mold, a blow head adapted to be brought into operative relation with each of the finishing molds at definite intervals and a pneumatically operated bottle lifting device adapted to remove the finished bottle from its mold.

8. In a bottle making machine, the combination with the central standard and the upper and lower turrets mounted thereon, moving in unison about a common axis and carrying the blank and finishing molds respectively, said upper and lower molds being arranged in radial alignment, a die arranged in each blank mold, pneumatically operated means for swinging each die from the blank mold over and into its respective finishing mold and simultaneously opening the same to release the blank in the finishing mold, a blow head adapted to be brought into operative relation with each finishing mold at a definite period and pneumatically operated gripping and swinging means for removing the finished bottle from the mold together with means for opening and closing the blank and finishing molds at predetermined periods.

9. In a bottle making machine, the combination with a circular series of blank molds, of a circular series of bottle finishing molds arranged below said blank molds, said finishing molds being rotatable in unison with said blank molds, a die positioned in each of said blank molds, a pneumatically operated device arranged at a point in the path of travel of said molds for turning a die with blank connected thereto from a blank mold into a bottle mold as said blank molds reach a predetermined station, means for blowing the blanks so turned, and pneumatic means for removing the finished article from said last mentioned molds.

10. In a bottle making machine, the combination with a circular series of blank molds, each having a die in the bottom thereof, of a circular series of bottle finishing molds arranged below said blank molds, said finishing molds being rotatable with said blank molds, a blow-head for closing the filled molds, said blow-head being adapted to convey air to the mold to force the glass about the die, a pneumatically operated device arranged in the path of travel of said molds for turning the die and blank connected thereto into a finishing mold as said blank molds reach a certain point, means for blowing the blank to the finished bottle, and pneumatic means for removing the finished articles from the mold as they reach a certain point.

11. In a bottle making machine, the combination with a circular series of blank molds, of a circular series of bottle molds arranged beneath the blank molds, said blank and bottle molds having a repeated step by step movement in one direction in unison about a common axis, each pair of blank and bottle molds being disposed in radial alignment with each other, means for forming a blank at one stage of revolution and a single pneumatically controlled mechanism arranged at a point in the path of travel of the molds for inverting and transferring said blanks at another stage of revolution, means for blowing the finished bottle at a still further stage of revolution and means for removing the finished bottles at a still further stage of revolution.

In testimony whereof, we hereunto affix our signatures.

JOHN J. MEYER, Jr.
JOHN G. LEPPER.